June 2, 1953     R. H. GEORGE     2,640,224
RESTRAINING DEVICE FOR FOWL
Filed Sept. 26, 1950     2 Sheets-Sheet 2

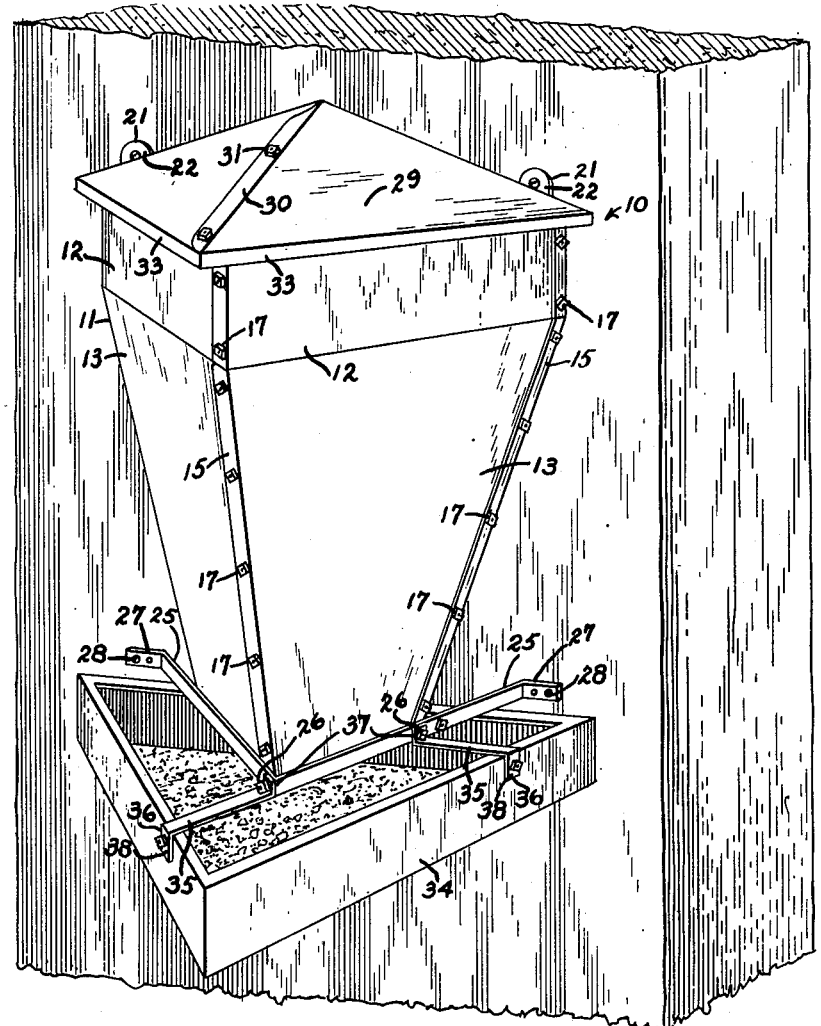
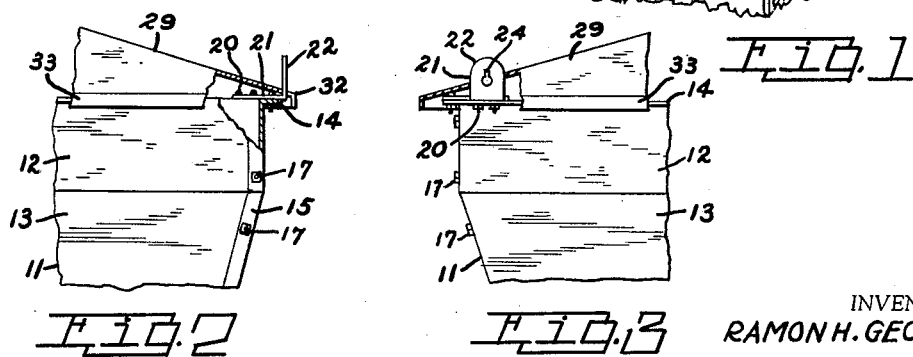

INVENTOR
RAMON H. GEORGE
BY J.B.Dickman Jr.
ATTORNEY

Patented June 2, 1953

2,640,224

UNITED STATES PATENT OFFICE 2,640,224

RESTRAINING DEVICE FOR FOWL

Ramon H. George, Baltimore, Md.

Application September 26, 1950, Serial No. 186,721

1 Claim. (Cl. 17—11)

The present invention relates to a combined feeding and retaining device for fowl, particularly turkeys.

In the killing of fowl for market, especially turkeys, the methods employed today of slitting the throat or by beheading and then throwing the body in a barrel or box, damages the flesh due to the flopping of the fowl during the death struggle, and during this struggle blood will soil the feathers of the fowl.

It is an object of the present invention to provide a device that will serve a two fold purpose, namely one that may be used as a feeder during the growing period, and one that may be used when the fowl are to be killed for market.

Another object of the present invention is the provision of a device that may easily be attached to, or detached from a surface or object.

A still further object of the present invention is the provision of a device so shaped that it will positively impinge the fowl to be killed, so that no damage will result to the flesh, and the feathers will be unsoiled.

A still further object of the present invention is the provision of a device that permits the head and neck of a fowl to be exposed for killing.

A still further object of the present invention is the provision of a combined feeding and killing device that may be placed at any desired place and above the ground.

A still further object of the present invention is the provision of a detachable top and feeding tray.

A still further object of the present invention is the provision of means for securing and suspending the device to a post or similar object.

A still further object of the present invention is the provision of a combined feeder and holder that is durable and one that may be manufactured and sold at a reasonable price.

Other and further objects of the present invention will appear in the following detailed description when studied in conjunction with the accompanying drawings, wherein:

Figure 1 is a perspective view of the device secured to a surface, post or the like.

Figure 2 is a partial section at one of the top corners and illustrating one of the support members.

Figure 3 is a partial section at one of the corners and illustrating in rear elevation one of the support members.

In the drawings like numerals of reference indicate corresponding parts throughout the different views.

Figure 6:
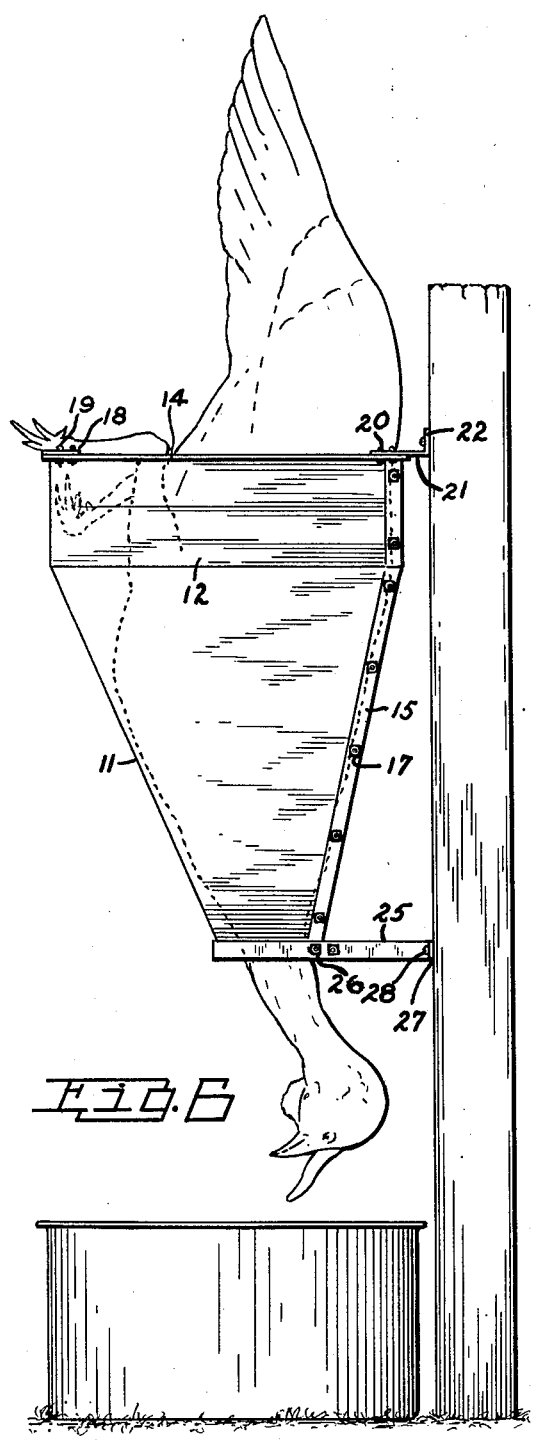
Figure 6 is a side elevational view of the device showing a turkey positioned therein and a blood receiving receptacle, the top and feeding tray being removed.
Figure 4:
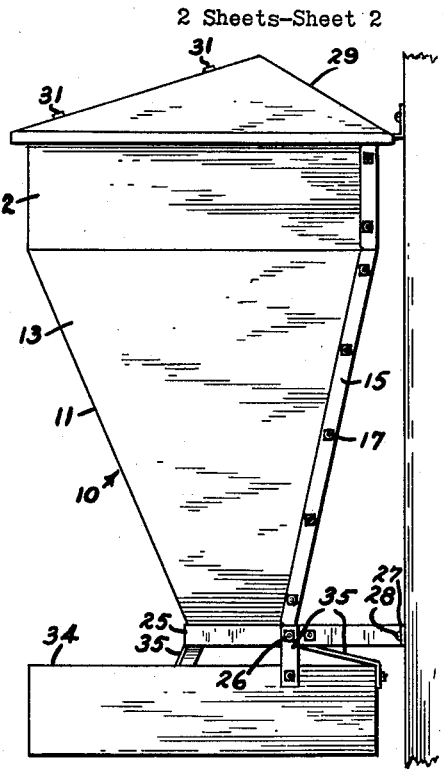
Figure 4 is a side elevational view of Figure 1.
Figure 5:
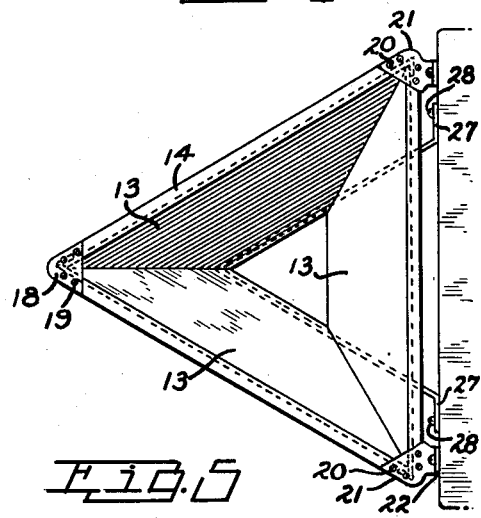
Figure 5 is a top elevational view of the device with the cover.

Referring to the drawings the numeral 10 represents the device and it comprises a body or hopper 11 having a plurality of plates, such plate at its top having a vertical portion 12 and tapering walls 13. The vertical portion 12 of each plate has a right-angular formed flange 14, that extends outwardly therefrom. Each plate has one of its longitudinal edges bent to form a locking flange 15, the flanges being provided with a plurality of apertures that are in spaced relation for a purpose to be later described. The straight or unbent longitudinal edge of each plate is provided with apertures adjacent each edge and they are in horizontal alignment with the apertures in the locking flange 15. The apertures adjacent the longitudinal straight edges of each plate and the apertures in the locking flange 15 of each plate receive bolts 17 that secure the plates together to form the body or hopper 11 into a three sided or triangular shaped object. To one corner on the top of flange 14 is a plate 18 that is secured to the flange 14 by bolts or rivets 19 that pass through apertures in the flange 14 and plate 18. To the flange 14 at the rear corners of the body or hopper 11, there is secured by rivets or bolts 20 brackets 21 having a vertical portion 22 that is provided with a circular opening that communicates with a slot 24. The bottom of the hopper is provided with a strap support 25 that may be secured to the body or hopper 11 by bolts 26, or the bottom end of the hopper may freely fit into the strap 25. The ends 27 of strap supports 25 are bent and each bent portion is provided with apertures that receive screws or bolts 28 for engagement with a support. By freely positioning the bottom of the body or hopper in the strap support a means is provided for quick removal of the body or hopper from a surface or object.

A cover 29 is provided for the body or hopper 11 that may be pressed and formed from a single piece of material, or it may be cut and formed from a single piece of material having a lapped portion 30 secured by bolts 31. The shape of the top is pyramidal having cut out portion in its side the cut out portions 32 engage the vertical portions 22 of the brackets 21. The top is provided with a depending edge 33 that engages and covers the flange portion 14.

A feeder tray 34 that is detachable from the body or hopper 11 is provided and in the shape of a triangle, and it is secured to the bottom of the body or hopper by straps 35 having their ends 36 bent at right angles and in opposed relation to each other. One end 37 of each strap is secured to the bottom of the body or hopper 11, the other end 38 being secured to the tray.

In the operation of the device, if the device is to be used as a feeder, the device is secured to a post, fence or other object and slightly above the ground level, and it is supported by screws that engage the circular openings and slots 24. The ends 27 of the strap supports 25 are secured to the supporting object by screws or bolts 28. The feeder tray is connected to the body or hopper 11 by the straps or arms 35. Feed is then placed in the hopper 11 and the amount of feed going into the tray 34 is regulated by the position of the bottom of the hopper relative to the bottom of the tray. The top is then placed on the body or hopper 11 to protect the feed therein. As the feed is consumed by fowls, it will automatically feed from the housing or hopper 11 into the tray.

If the device is to be used to kill fowl, especially turkeys, the cover 29 and the feeder tray 34 is removed. Due to the triangular shape of the housing or hopper, a turkey is inserted into the hopper 11 with its back and wings, as shown in Figure 6, to the rear of the housing 11, the breast being received by the front portion and engaging the angular configuration. From the showing and description, it can be seen that a turkey or other fowl will be impinged in the body 11 and immovable therein, the head and neck as shown in Figure 6 being exposed for execution, with a pan beneath to catch the blood. After the throat has been slit, and during the death struggle, it is impossible for the turkey or other fowl to move due to its impingement in the housing, the positive impingement being provided by the triangular configuration of the body 11.

While the present invention has been disclosed in connection with certain embodiments thereof, it is to be understood that these are by way of examples rather than by way of limitation, and that the invention is to be defined by the attendant claim which should be given a scope as broad as is consistent with the prior art.

What is claimed is:

A fowl holding device, comprising a triangular body, the top portion of said body having vertical walls, the lower portion of said body having converging walls, each of said vertical and said converging walls having a plane surface.

RAMON H. GEORGE.

References Cited in the file of this patent

UNITED STATES PATENTS

| Number | Name | Date |
|---|---|---|
| 351,505 | Fiske | Oct. 26, 1886 |
| 462,117 | Emerson | Oct. 27, 1891 |
| 1,347,425 | Wenger | July 20, 1920 |
| 1,410,640 | Baker | Mar. 28, 1922 |
| 2,490,761 | McDowell | Dec. 6, 1949 |

FOREIGN PATENTS

| Number | Country | Date |
|---|---|---|
| 497,160 | Germany | May 3, 1930 |